(12) United States Patent
Bail

(10) Patent No.: US 6,834,220 B1
(45) Date of Patent: Dec. 21, 2004

(54) SELF-PROPELLING VEHICLE

(75) Inventor: Gunther Bail, Garmisch-Partenkirchen (DE)

(73) Assignee: Bail GmbH, Garmisch-Partenkirchen (DE)

( * ) Notice: Subject to any disclaimer, the term of this patent is extended or adjusted under 35 U.S.C. 154(b) by 0 days.

(21) Appl. No.: 10/130,405

(22) PCT Filed: Oct. 31, 2000

(86) PCT No.: PCT/DE00/03855

§ 371 (c)(1),
(2), (4) Date: May 15, 2002

(87) PCT Pub. No.: WO01/37059

PCT Pub. Date: May 25, 2001

(30) Foreign Application Priority Data

Nov. 17, 1999 (EP) ............................................. 99122846

(51) Int. Cl.[7] ........................ G06F 165/00; G01C 22/00; G05D 1/00
(52) U.S. Cl. ............................ 701/25; 701/23; 180/167
(58) Field of Search .............................. 701/23, 25, 26, 701/200, 24, 217; 180/167, 168, 169; 299/1.05; 318/580, 587; 702/94

(56) References Cited

U.S. PATENT DOCUMENTS

| 4,727,492 A | * | 2/1988 | Reeve et al. ................. 364/424 |
| 4,860,209 A | * | 8/1989 | Sugimoto et al. ...... 364/424.02 |
| 5,204,814 A | * | 4/1993 | Noonan et al. ......... 364/424.02 |
| 5,276,618 A | * | 1/1994 | Everett, Jr. ............. 364/424.02 |
| 5,367,456 A | * | 11/1994 | Summerville et al. . 364/424.02 |
| 5,897,603 A | * | 4/1999 | Henderson ................... 701/207 |
| 5,999,865 A | * | 12/1999 | Bloomquist et al. ........... 701/25 |
| 6,253,128 B1 | * | 6/2001 | Kageyama et al. ............ 701/23 |
| 6,480,768 B1 | * | 11/2002 | Torii ............................ 701/23 |

* cited by examiner

Primary Examiner—Tan Q. Nguyen
Assistant Examiner—Dalena Tran
(74) Attorney, Agent, or Firm—Greer, Burns & Crain, Ltd.

(57) ABSTRACT

The invention relates to a self-propelling vehicle which first, and possibly with the aid of a driver, drives along a selected route from a starting point to a destination, whereby the vehicle receives position signals from a positioning system and stores said signals in a data memory. The vehicle first receives an associated current position signal from the positioning system and at a point of departure when the vehicle subsequently and automatically drives along exactly the same selected route. Said signal is compared to the position of the starting point. If the positions do not match, the evaluation device calculates the direction towards and the distance to the starting point, whereupon the vehicle drives along this route. The direction and the distance to the next stored position are subsequently calculated using successively received current position data. The vehicle drives along the corresponding route. The vehicle can drive along a predetermined route inside a building when a local positioning system is used.

10 Claims, No Drawings

SELF-PROPELLING VEHICLE

FIELD OF THE INVENTION

The present invention relates to a self-propelling vehicle which is equipped with a receiving and evaluating means for position signals, so that it can constantly receive information about the coordinates of its respective location.

BACKGROUND OF THE INVENTION

EP-A-0 489 915 discloses a navigation system for the driver of an automotive vehicle. Said navigation system is to improve the former map display system which creates safety problems, and the conventional arrow display system which has the drawback that the driver often turns to the right or left too early from the road which is just being driven along. According to the disclosed invention the navigation system of the automotive vehicle displays the route of travel through which the vehicle is just driving, together with information on the target position. Said traveling line is displayed on a screen.

EP 0 782 723 B1 discloses such a self-propelling vehicle which can automatically follow a mobile transmitting means. The vehicle may be a golf caddy which follows a golf player who carries the mobile transmitting means. Both the vehicle and the mobile transmitting means are equipped with a receiving and evaluating means provided with a computer for a satellite-controlled positioning system. The mobile transmitting means transmits its respective position to the vehicle by means of a HF hand-held transmitter at regular time intervals, the vehicle comparing said position with its own position and calculating the traveling route therefrom.

SUMMARY OF THE INVENTION

The present invention does not deal with the problem that a self-propelling vehicle is to follow a mobile transmitting means along its route, but the vehicle is to be able to drive exactly along one (or several) previously defined routes.

This problem is solved by the features of patent claim 1. Advantageous developments of the invention are characterized in the dependent claims.

DETAILED DESCRIPTION OF THE PREFERRED EMBODIMENT

The system of the invention for controlling a self-propelling vehicle provides as the first step that the position data of a selected route from a starting point to a destination are entered in the data memory. According to one embodiment the position data of the route to be driven along are directly entered or programmed without the route being driven along for such a purpose.

In another embodiment of the invention, said first step is as follows: the vehicle first drives along a selected route from a starting point to a destination, preferably with the help of a driver, with the vehicle receiving position signals from a positioning system at preferably regular time intervals of e.g. 1 s and storing said signals as a data sequence in a data memory. The vehicle has thus stored the coordinates of route points located in any desired close way side by side.

For automatically following said programmed route, the vehicle receives a current position signal which is compared by the computer of the vehicle with the programmed position of the starting point of the traveling route. If the two positions do not match, direction and distance from the starting point are calculated, whereupon the control means of the vehicle becomes operative such that the vehicle travels to the starting point.

The vehicle receives its respective current position data from the positioning system at predetermined time intervals, the current position data being each compared with the next stored position of the traveling route. Direction and distance to the next predetermined position are calculated point for point, and the drive means and control unit are operated such that the pre-programmed route is driven along.

Since the vehicle receives signals from the positioning system in a short time sequence and the evaluating means calculates the respective current position of the vehicle from said signals, the vehicle can follow the stored positions of the desired traveling route with high accuracy because deviations from the desired route are immediately detected and corrected.

The positioning system whose signals are received by the vehicle may be a satellite navigation system such as GPS. Moreover, the system according to the invention may include a stationary reference transmitter which also transmits position signals to the vehicle, so that the evaluating means thereof can correct the position data received from the satellite navigation system, whereby inaccuracies of the position data of a satellite navigation system which are within the range of a few meters are corrected and the vehicle always calculates its exact position coordinates.

With the system according to the invention, a transportation vehicle or also a lawn mower, for example, can exactly follow a selected traveling route at desired times without the help of an operator.

According to a further suggestion of the invention, the vehicle is equipped with sensors which can detect obstacles positioned along its path. Said sensors may e.g. be microwave/ultrasonic and/or infrared transmitters.

When an obstacle, such as an animal or a parked vehicle, is positioned along the traveling route, the vehicle is preferably stopped and remains in said inoperative position for a predetermined period of time and will only continue its travel after the obstacle has been removed. If it is not removed, the control means can guide the vehicle along a defined alternative path around the obstacle, and the traveling route to the next stored route point positioned behind the obstacle is determined on the basis of the next current position signal received.

New obstacles that appear are bypassed at a safety distance, while a practicable distance can be predetermined in the case of fixed obstacles permanently positioned within the path.

If the vehicle determines its position with the help of a satellite navigation system, it can drive along a predetermined route only outdoors. The present invention suggests in this connection that instead of a satellite navigation system a local positioning system can be used that covers a room such as a factory hall or salesroom e.g. with four reference transmitters, thereby geographically defining every point within said room. Within a building, e.g. four antennae transmit pulses which are evaluated by the receiving and evaluating means of the vehicle for determining its respective coordinates in the room such as in the case of a satellite navigation system. With such a local positioning system an industrial cleaning machine, for instance, can travel through a hall along a predetermined route, first with the help of a driver, the position data of said route being stored in the memory of the machine, whereupon the cleaning machine will exactly follow the route without a driver being required.

Such a local positioning system with reference transmitters of its own can also be used outdoors, for instance on a golf course or in a garden, so that a satellite navigation system can be dispensed with. The local positioning system can also be used in cases where a vehicle is to follow a movable transmitter automatically.

What is claimed is:

1. A system for controlling a self-propelling vehicle comprising
   a positioning system for transmitting position signals and a self-propelling vehicle containing position signal receiving means, position signal evaluating means, data memory storage means, and vehicle control means,
   characterized by the following steps:
   a) storing in the data memory the position data of a selected route from a starting point to a destination;
   b) causing said vehicle to follow said selected route automatically in that
   b1) at a point of departure it receives a current position signal from the positioning system and compares said signal with the stored position of said starting point and, if said position data do not match, calculates direction and distance to said starting point therefrom and causes the vehicle to travel from said current position of departure to the starting point, and
   b2) then receives current position data in successive order and calculates direction and distance to the next stored position and causes the vehicle to drive along the selected route.

2. The system according to claim 1, characterized in that in step a) the position data of the selected route are directly programmed.

3. The system according to claim 1, characterized in that in step a)
   a1) said vehicle is driven along a selected route from a starting point to a destination and
   a2) said position signal receiving means receives position signals from the positioning system at time intervals and stores said signals in the data memory.

4. The controlling system according to claim 1, characterized in that said positioning system is a satellite navigation system such as GPS.

5. The controlling system according to claim 1, characterized in that said receiving means receives position signals from a stationary reference transmitter and determines its corrected exact position data therefrom.

6. The controlling system according to claim 1, characterized in that said positioning system is a local positioning system.

7. The controlling system according to claim 6, characterized in that said vehicle drives along said route within a building.

8. The controlling system according to claim 1, characterized in that said vehicle detects an obstacle along said route with the help of sensors.

9. The controlling system according to claim 8, characterized in that said vehicle stops upon detection of an obstacle.

10. The controlling system according to claim 8, characterized in that said vehicle bypasses an obstacle in its way along a pre-programmed path.

* * * * *